United States Patent
Chiu et al.

(10) Patent No.: US 8,499,201 B1
(45) Date of Patent: Jul. 30, 2013

(54) METHODS AND SYSTEMS FOR MEASURING AND PRESENTING PERFORMANCE DATA OF A MEMORY CONTROLLER SYSTEM

(75) Inventors: Gordon Raymond Chiu, Richmond Hill (CA); Joshua David Fender, East York (CA); Clement C. Tse, Fremont, CA (US); Deshanand Singh, Mississauga (CA)

(73) Assignee: Altera Corporation, San Jose, CA (US)

( * ) Notice: Subject to any disclaimer, the term of this patent is extended or adjusted under 35 U.S.C. 154(b) by 415 days.

(21) Appl. No.: 12/841,762

(22) Filed: Jul. 22, 2010

(51) Int. Cl.
*G06F 11/00* (2006.01)

(52) U.S. Cl.
USPC .............................. 714/46; 714/42

(58) Field of Classification Search
USPC ...................... 714/47.1, 42, 46, 57
See application file for complete search history.

(56) References Cited

U.S. PATENT DOCUMENTS

| | | | |
|---|---|---|---|
| 4,796,232 A | 1/1989 | House | |
| 5,745,931 A | 5/1998 | Ball | |
| 6,253,297 B1 | 6/2001 | Chauvel et al. | |
| 7,206,891 B2 | 4/2007 | Emerson et al. | |
| 7,349,241 B2 | 3/2008 | Wood | |
| 7,516,320 B2 | 4/2009 | Khan et al. | |
| 7,949,851 B2* | 5/2011 | Allen et al. | 711/203 |
| 2002/0132661 A1 | 9/2002 | Lind et al. | |
| 2005/0114566 A1* | 5/2005 | Chen et al. | 710/38 |
| 2009/0019184 A1 | 1/2009 | Skerlj et al. | |
| 2009/0319718 A1* | 12/2009 | Aldworth et al. | 711/5 |
| 2010/0296352 A1* | 11/2010 | Choi et al. | 365/194 |
| 2011/0185140 A1* | 7/2011 | Arakawa | 711/165 |
| 2011/0191526 A1* | 8/2011 | Haukness et al. | 711/103 |
| 2011/0276817 A1* | 11/2011 | Fullerton et al. | 713/324 |
| 2012/0249564 A1* | 10/2012 | Liu et al. | 345/522 |

* cited by examiner

*Primary Examiner* — Bryce Bonzo
(74) *Attorney, Agent, or Firm* — Weaver Austin Villeneuve & Sampson LLP

(57) ABSTRACT

Mechanisms for measuring, analyzing, and presenting performance data associated with a memory controller system are described. The mechanisms include a performance monitor that detects and analyzes performance including efficiency and latency of a memory controller system. In addition to determining performance, the systems identifies reasons for loss of memory controller system efficiency. Moreover, the reasons, the efficiency, and the latency are analyzed and presented in a manner easily understandable to a user.

25 Claims, 14 Drawing Sheets

METHODS AND SYSTEMS FOR MEASURING AND PRESENTING PERFORMANCE DATA OF A MEMORY CONTROLLER SYSTEM

FIELD OF THE INVENTION

The present disclosure relates to methods and systems for measuring and presenting performance data of a memory controller system.

BACKGROUND

An integrated circuit typically includes a memory controller to provide a processor with read and write access to data stored in memory. The memory controller may be implemented on the same chip as the processor, or may be implemented on a separate chip.

More efficient memory controllers and memory access schemes are required in many instances to meet system requirements and benefit from advances in processor and memory technology. However, conventional mechanisms available for improving memory access performance are limited. Consequently, it is desirable to provide mechanisms that allow improved memory access performance.

SUMMARY OF THE INVENTION

Mechanisms for measuring, analyzing, and presenting performance data associated with a memory controller system are described. The mechanisms include a performance monitor that detects and analyzes performance including efficiency and latency of a memory controller system. In addition to determining performance, the systems identifies reasons for loss of memory controller system efficiency. Moreover, the reasons, the efficiency, and the latency are analyzed and presented in a manner easily understandable to a user.

BRIEF DESCRIPTION OF THE DRAWINGS

The systems and techniques may best be understood by reference to the following description taken in conjunction with the accompanying drawings, which illustrate specific embodiments of the present invention.

DETAILED DESCRIPTION

Figure 1:
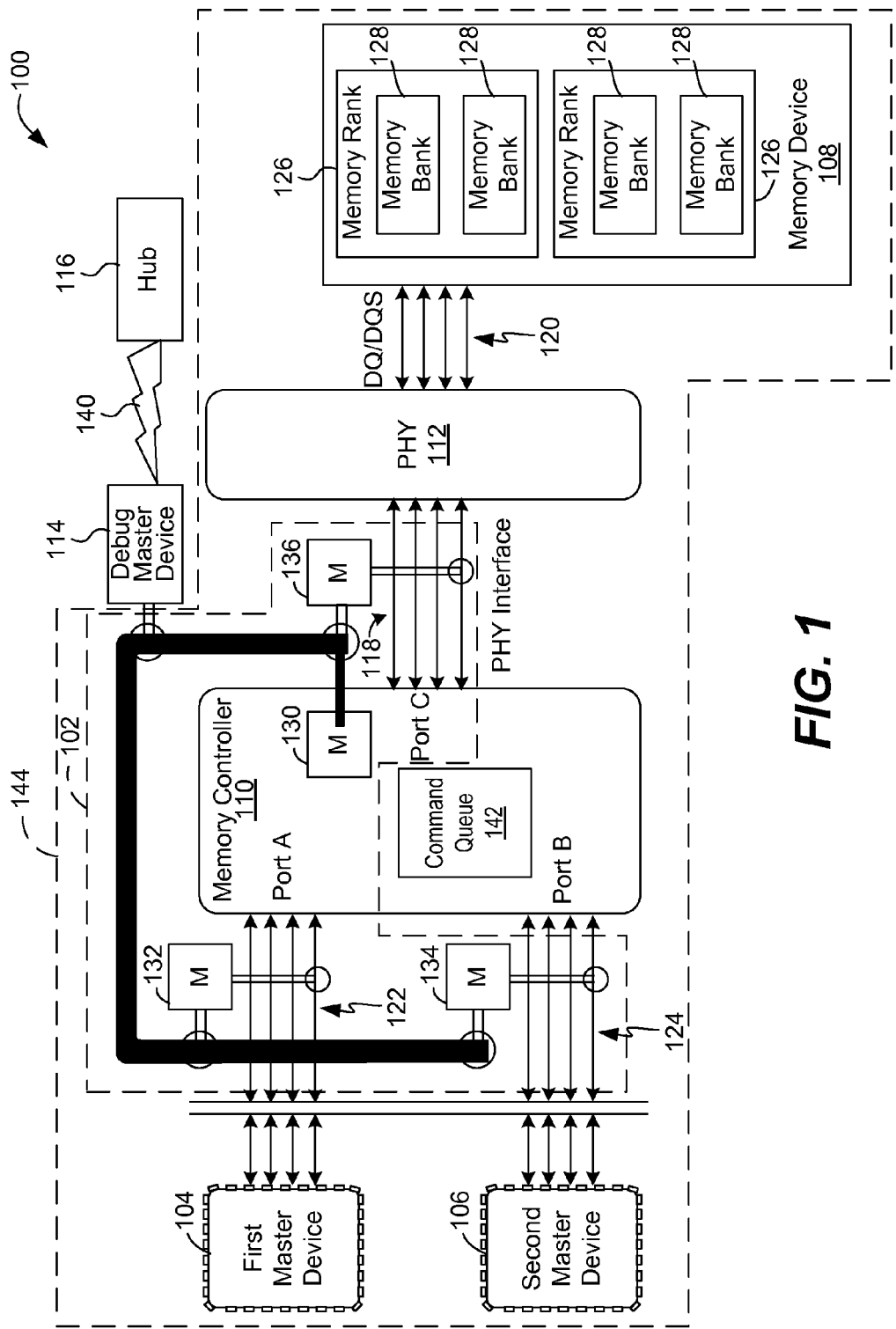
FIG. 1 is a block diagram of an embodiment of a system including a performance debug interface.

FIG. 1 is a block diagram of an embodiment of a system 100 including a performance debug interface 102. System 100 includes a first master device 104, a second master device 106, a memory device 108, a memory controller 110, a physical layer (PHY) 112, a debug master device 114, a hub 116, a physical interface 118, a memory interface 120, a first local controller interface 122, and a second local controller interface 124. Memory interface 120 is a data signal or differential data signal (DQ/DQS) interface. Memory interface 120 connects physical layer 112 with memory device 108. Physical interface 118 is sometimes referred to herein as a memory controller interface. First local controller interface 122 connects a port A of memory controller 110 with first master device 104 and second local controller interface 124 connects a port B of memory controller 110 with second master device 106. Physical interface 118 connects a port C of memory controller 110 with physical layer 112.

Memory device 108 includes any number of memory ranks 126 and each memory rank 126 includes any number of memory banks 128. Memory controller 110 includes a memory controller monitor 130. Moreover, system 100 includes a first local controller interface monitor 132, a second local controller interface monitor 134, and a physical interface monitor 136. System 100 also includes a connection bus 138 that connects monitors 130, 132, 134, and 136 with debug master device 114. Memory controller 110 is a dual-port memory controller, which is connected via port A and first local controller interface 122 to first master device 104 and is connected via port B and second local controller interface 124 to second master device 106.

First master device 104 or second master device 106 may be a scheduler or a processor, such as a NIOS™ II embedded processor, manufactured by Altera™ Corporation of San Jose, Calif. Debug master device 114 includes a transceiver that transmits information, received from monitors 130, 132, 134, and/or 136 via connection bus 138, to hub 116 via a network 140 and/or provides information received, via network 140, from hub 116 to monitors 130, 132, 134, and/or 136 via connection bus 138. Network 140 may be a local area network (LAN), such as the Intranet or a wide area network (WAN), such as the Internet. Each interface is a bus. For example, first local controller interface 122 or second local controller interface 124 may be an Avalon™ bus.

Physical layer 112 applies a physical layer of an Open System Interconnection (OSI) reference model of computer networking to communicate via memory interface 120 with memory device 108. Hub 116 is connected to debug master device 114 and to one or more computers or a network device of network 140. Examples of the network device include switches, routers, and repeaters. Each memory bank 128 may be a random access memory. Memory device 108 may be a single memory module or a plurality of memory modules. Memory controller 110 includes a command queue 142, which is a storage device, such as a set of registers. Hub 116 includes a processing unit, described below.

Moreover, each of first master device 104, second master device 106, local controller interfaces 122 and 124, memory controller 110, monitors 130, 132, 134, and 136, physical layer 112, debug master device 114, physical interface 118, connection bus 138, and memory interface 120 are implemented as hardware and embedded within an integrated device chip including an application specific integrated circuit (ASIC), a programmable logic device (PLD), such as a field programmable gate array (FPGA) described below, or a combination of the ASIC and PLD.

Each of first master device 104, second master device 106, first local controller interface 122, second local controller interface 124, first local controller interface monitor 132, second local controller interface monitor 134, memory controller 110, connection bus 138, physical interface 118, memory controller monitor 130, physical interface monitor 136, physical layer 112, memory interface 120, and memory device 108 are part of a memory controller system 144.

Each of first master device 104 and second master device 106 sends a plurality of user commands to memory controller 110 via corresponding first and second local interface buses 122 and 124 to read or write data from memory device 108. Each of first master device 104 and second master device 106 sends a user command to memory controller 110.

Memory controller 110 receives a user command to read from or write data to memory device 108 from first or second master device 106, stores the user command in command queue 142, converts the user command into a plurality of memory controller commands, such as a read command, a write command, an activate command, a precharge command, or a combination of the commands. Memory controller 110 sends the memory controller commands to physical layer 112 via physical interface 118 and the physical layer 112 applies the physical layer to the memory controller commands and sends the memory controller commands via memory interface 120 to memory bank 128. Data is written to or read from memory bank 128 based on the memory controller commands. In case of a read operation, memory controller 110 receives, via physical layer 112, memory interface 120, and physical interface 118, data read from memory bank 128 and generates a response including the data read to send to first or second master device 106 that generated a user command to perform the read operation.

Upon sending a response including a performance of a read operation to first or second master device 106 that sent a user command to perform the read operation, memory controller 110 retires, such as deletes, the user command from command queue 142. In case of a write operation, upon issuing a write command to memory bank 128, memory controller 110 generates a response including an acknowledgment of the performance of the write operation, sends the response to first or second master device that issued a user command to perform the write operation, and retires the user command from command queue 142.

First local controller interface monitor 132 measures an efficiency of first local controller interface 122. For example, first local controller interface monitor 132 includes an arithmetic integrated circuit that determines a difference between a ratio and an amount of delay caused by unavailability of first master device 104 or a user command from the first master device 104. The ratio is a ratio of time, calculated by a set of timers of first local controller interface monitor 132, for which first local controller interface 122 is utilized by a user command issued by first master device 104 to write to or read from memory bank 128 over a total amount of time period taken from issuance of the user command, by first master device 104, to retiring the user command from command queue 142, where the user command is retired at a time the write or read is finished.

The delay caused by unavailability of first master device 104 or of user command is measured by the set of timers of first local controller interface monitor 132. The unavailability of first master device 104 may be a result of usage of first master device 104 in performing an operation other than issuing a user command, malfunction of the first master device 104, or inoperability of the first master device 104. The unavailability of user command may be a result of the unavailability of first master device 104 or a lack of need to issue the user command.

Similarly, second local controller interface monitor 134 measures an efficiency, an average efficiency, a maximum efficiency, or a minimum efficiency of second local controller interface 124.

Physical interface monitor 136 measures an efficiency of physical interface 136. The efficiency of physical interface 136 is a ratio of time period. Memory interface 120 is utilized to read data from or write data to memory bank 128 over a total amount of time period taken from issuing a user command to perform the read or write to retiring the user command from command queue 142.

The efficiency of physical interface 136 differs from the efficiency of first local controller interface 122 or second local controller interface 124 as a result of memory controller 110 being a multi-port memory controller, an error code check (ECC) performed, a data mask, and/or misaligned bursts of data.

First local controller interface monitor 132 also measures a latency of first local controller interface 122. For example, first local controller interface monitor 132 includes an arithmetic integrated circuit that measures a latency of first local controller interface 122 as a difference between a first amount of time period and a second amount of time period during which first master device 104 is unavailable. The first amount of time period is a difference between a first time at which a response to a user command is provided by memory controller 110 to first master device 104 and a second time at which the user command is received by memory controller 110 from first master device 104. The second amount of time period and the first and second times are measured by a timer of first local controller interface monitor 132 and stored in a storage device, such as a FIFO, of first local controller interface monitor 132.

Similarly, second local controller interface monitor 134 measures a latency, an average latency, a minimum latency, and/or a maximum latency of second local controller interface 124.

First local controller interface monitor 132 includes a trace logger (not shown) that logs local controller transaction information, such as a transaction address, burst length, and timestamp, for each local controller transaction, such as a communication of a user command, between first master device 104 and memory controller 110. For example, the trace logger stores within a storage device (not shown) of first local controller interface monitor 132 a transaction address including a port identifier (ID) of port A, a bank address of a memory cell within memory bank 128, a burst length of data read from the memory bank 128, a time of occurrence of a local controller transaction, such as a communication of a user command, sent by first master device 104 to memory controller 110.

The trace logger logs local controller transaction information in a trigger-based mode or a continuous mode. For example, in the trigger-based mode, the trace logger initiates logging local controller transaction information upon receiving a communication from memory controller monitor 130 that there is an efficiency loss of memory controller 110 or from physical interface monitor 136 that there is an efficiency loss of physical interface 118. As another example, in the trigger-based mode, the trace logger initiates logging local controller transaction information upon receiving a command from a user via hub 116 (FIG. 1) and network 140 (FIG. 1). The user provides the command via an input device, such as one described below. As yet another example, in the continuous mode, the trace logger logs the local controller transaction information continuous independent of whether there is a trigger to log the information. In the continuous mode, the trace logger logs a small percentage, such as approximately 1% or 2%, of the local controller transaction information but this log is sufficient to generate a suitable data pattern. Hub 116 (FIG. 1) can obtain the local controller transaction information via debug master device 114 and network 140 (FIG. 1) or via a Join Test Action Group (JTAG) interface and network 140. Similarly, second local controller interface monitor 134 includes a trace logger (not shown) that logs local controller transaction information, such as a transaction address, burst length, and timestamp, for each local controller transaction between second master device 106 and memory controller 110.

In another embodiment, first local controller interface monitor 132 measures an average efficiency of first local controller interface 122 by averaging multiple efficiencies over a plurality of user commands issued by first master device 104. In an alternative embodiment, memory controller 110 is connected via a single port, a single local controller interface, and an arbitration layer to first and second master devices 104 and 106. In another alternative embodiment, first master device 104, second master device 106, local controller interfaces 122 and 124, memory controller 110, monitors 130, 132, 134, and 136, physical layer 112, debug master device 114, physical interface 118, connection bus 138, and/or memory interface 120 are implemented as hardware and embedded within an integrated device chip, and the chip may be connected to a computing device, such as a computer, a personal digital assistant (PDA), or a cellular phone, via a joint test action group (JTAG) interface and/or a network, such as network 140.

In yet another embodiment, physical interface monitor 136 measures an average efficiency of physical interface 118 by averaging a plurality of efficiencies of physical interface 118 over a plurality of consecutive user commands issued by first or second master device 106.

In still another embodiment, first local controller interface monitor 132 determines an average latency as an average of a plurality of latencies measured over a plurality of consecutive user commands issued by first master device 104, a maximum of the latencies, and/or a minimum of the latencies.

In another embodiment, system 100 does not include first or second master device 106. Moreover, in this embodiment, memory controller 110 is a single port memory controller 110, which is connected via port A and first local controller interface 122 to first master device 104 or via port B and second local controller interface 124 to second master device 106.

In an alternative embodiment, debug master device 114 is connected to hub 116 directly and not via network 140. In another alternative embodiment, memory ranks 126 are located on separate memory devices. For example, memory rank 126 is located on a first memory device and another memory rank 126 is located on a second memory device.

Figure 2:
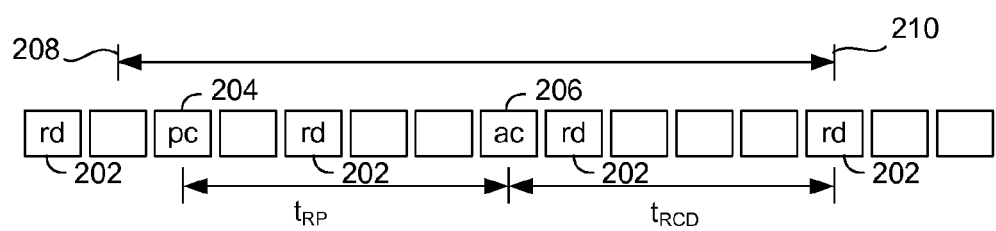
FIG. 2 is a block diagram of an embodiment of a method illustrating a latency of a memory controller of the system of FIG. 1.

FIG. 2 is a block diagram of an embodiment of a method illustrating a latency of memory controller 110 (FIG. 1). Memory controller 110 (FIG. 1) issues a plurality of read commands 202, a plurality of precharge commands 204, and a plurality of activate commands 206 although a single activate command 206 and a single precharge command 204 is shown in FIG. 2. A precharge command is used to deactivate a portion, such as a page, of memory bank 128 after reading data from or writing data to memory bank 128 and the a read or write command usually precedes the precharge command. An activate command is used to activate a portion, such as a row, of memory cells of memory bank 128 preceding to issuance of a read command to read data from or a write command to write data to the row.

Each block shown in FIG. 2 is issued by memory controller 110 (FIG. 1) synchronous with and during a clock cycle. For example, read command 202 is issued during a clock cycle, precharge command 204 is issued during a clock cycle, and activate command 206 is issued during a clock cycle. As another example, as illustrated in FIG. 2, there are four clock cycles, between two consecutive read commands 202.

A latency of memory controller 110 (FIG. 1) is measured from a time 208 at which a user command, such as a user command to read data from or write data to memory bank 128, enters memory controller 110 via a local controller interface to a time 210 at which read command 202 is issued by memory controller 110 by converting the user command. All clock cycles cause latency but not all clock cycles cause a loss in efficiency of memory controller 110. A time period between times 208 and 210 is a latency of memory controller 110.

'$t_{RP}$' is a precharge-to-activate delay between precharge command 204 and activate command 206, and '$t_{RCD}$' is an activate-to-read delay between activate command 206 and read command 202. Precharge command 204 is used to deactivate a page, of memory bank 128, from which data is read by using read command 202 and activate command 206 is used to activate a row of memory bank 128, from which data is to be read.

In an alternative embodiment, each read command 202 of FIG. 2 is replaced by a write command.

Figure 3:
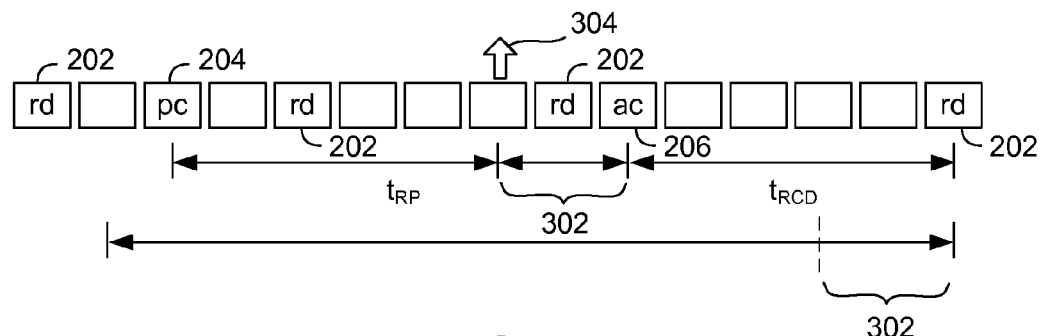
FIG. 3 is a block diagram of an embodiment of a method illustrating a change in latency.

FIG. 3 is a block diagram of an embodiment of a method illustrating a change 302 in latency, which results in a loss in efficiency, of memory controller 110. Memory controller 110 cannot issue activate command 206 until two clock cycles after a clock cycle 304 in which memory controller 110 is required, based on a timing requirement, to issue activate command 206. Accordingly, memory controller 110 also incurs a two clock cycle delay in issuing read command 202. This two cycle delay is change 302, such as an increase, in latency of memory controller 110. A latency of memory controller 110 increases by two clock cycles as compared to a time period between times 208 and 210 (FIG. 2).

In an alternative embodiment, read command 202 of FIG. 3 is replaced by write command.

Figure 4:
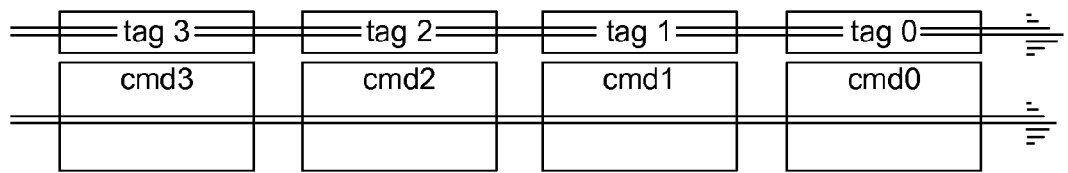
FIG. 4 is a block diagram of an embodiment of a method illustrating generation of a plurality of tags from a plurality of user commands used within the system of FIG. 1.

FIG. 4 is a block diagram of an embodiment of a method illustrating generating a plurality of tags 0, 1, 2, and 3 from a plurality of user commands. Memory controller 110 receives a plurality of user commands (cmd) 0, 1, 2, and 3, from first master device 104 and/or second master device 106, and stores the user commands in command queue 142. Memory controller 110 extracts information about a local controller transaction, such as a communication of a user command, between a master device, such as first or second master device 106, and memory controller 110 into a tag, which may be a single word tag or a multi-word tag. For example, master controller 110 generates tag 0 from a user command 0, generates tag 1 from a user command 1, generates tag 2 from a user command 2, and generates tag 3 from a user command 3.

The information extracted by memory controller 110 into a tag includes a port ID that identifies whether a user command is received via port A or port B of memory controller 110. The information extracted by memory controller 110 into a tag from a user command also includes a master device ID that identifies whether the user command is received from first or second master device 106. The information extracted by memory controller 110 into a tag from a user command further includes whether the user command is to perform a read or a write operation with respect to memory bank 128 and also includes a bank address of a location, such as a memory cell, within memory bank 128 from which a read is to be performed or to which a write is to be performed.

Memory controller 110 stores a plurality of tags 0, 1, 2, and 3, extracted from user commands 0, 1, 2, and 3 into a storage device, such as a First-in-First-out (FIFO), that operates synchronous, such as in parallel, with user commands 0, 1, 2, and 3 in command queue 142.

Figure 5:
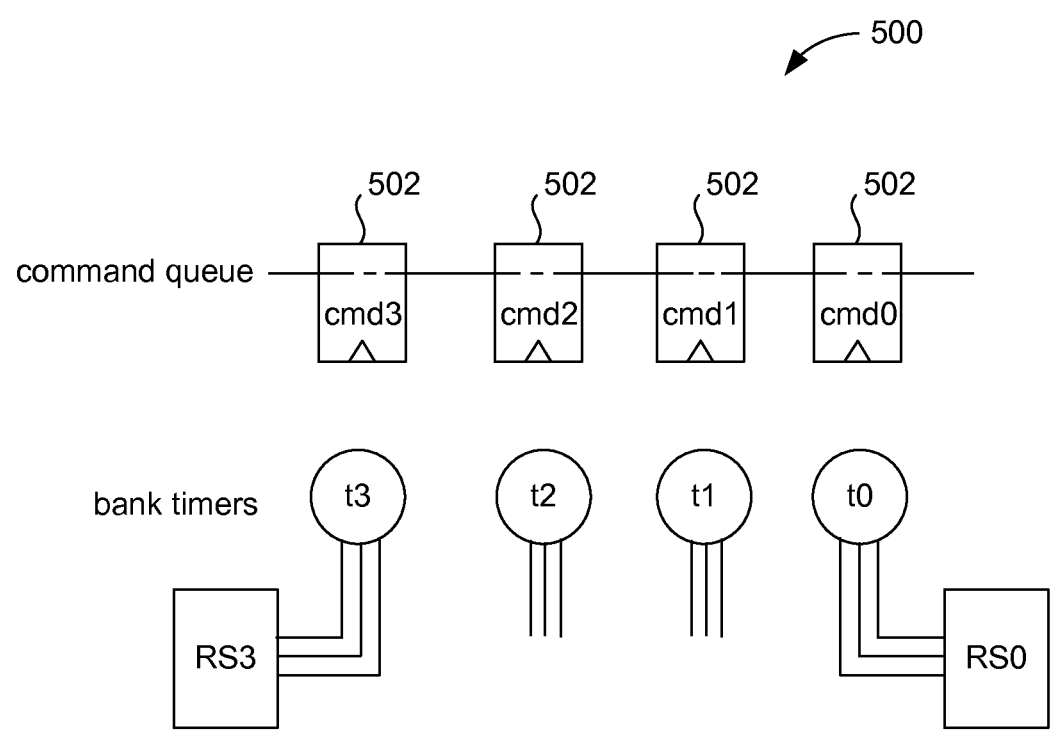
FIG. 5 is a block diagram of an embodiment of a system for calculating an amount of time taken by the memory controller to perform a variety of operations.

FIG. 5 is a block diagram of an embodiment of a system 500 for calculating an amount of time taken by memory controller 110 to perform a variety of operations. System 500 includes a plurality of registers 502 of command queue 142 (FIG. 1). Registers 502 store user commands 0, 1, 2, and 3. System 500 includes a plurality of sets t0, t1, t2, and t3 of timers, one for each user command. Each set t0, t1, t2, and t3 of timers is located within memory controller monitor 130 (FIG. 1) and includes one or more timers. System 500 further includes a plurality of register sets RS0 and RS3. Each register set RS0 and RS3 includes one or more registers.

A set of timers measures time with respect to read, write, precharge, and activate commands that are generated by converting a user command. For example, set t0 measures time periods with respect to read, write, precharge, and activate commands that are generated by converting user command 0, set t1 measures time periods with respect to read, write, precharge, and activate commands that are generated by converting user command 1, set t2 measures time periods with respect to read, write, precharge, and activate commands that are generated by converting user command 2, and set t3 measures time periods with respect to read, write, precharge, and activate commands that are generated by converting user command 3.

Each set of timers include a precharge command delay timer that measures a precharge command delay, an activate command delay timer that measures an activate command delay, and a read/write command delay timer that measures a read/write command delay. The precharge delay includes a read/write to precharge delay, an activate-to-precharge command delay, a can't lookahead to block contention delay, a no valid command delay, a command contention delay, or a combination of the delays. The precharge command delay timer includes a can't lookahead to block contention unit that measures a can't lookahead to block contention delay. The read/write to precharge command delay is a delay between issuing, by memory controller 110, a read or write command and issuing, by memory controller 110, a precharge command, where in between the read/write command and the precharge command, there is no other read/write and precharge command. The read to precharge command delay is indicated as $t_{RTP}$ and write to precharge command delay is indicated as $t_{CL}+t_{WR}$.

The activate-to-precharge command delay is a delay between issuing, by memory controller 110, an activate command generated by converting a user command and issuing, by memory controller 110, a precharge command generated by converting the same user command, where in between the activate and precharge commands, there is no other activate and precharge command issued by memory controller 110. The can't lookahead to block contention delay may be sometimes referred to herein as bank contention. The can't lookahead to block contention delay is a delay in issuing, by memory controller 110, a first set of memory controller commands, such as a first read command, a first write command, a first activate command, and a first precharge command, to memory bank 128 for a user command because a second set of memory controller commands for the same or another user command is utilizing, such as reading from, writing to, activating, or precharging, the same memory bank 128 at a time the first set of memory controller commands are issued. For example, memory controller 110 cannot issue the first precharge command to memory bank 128 until the second memory controller commands complete using the memory bank 128.

The no valid command delay includes an amount of delay in issuing a read command, a write command, a precharge command, or an activate command from a user command delayed by the same delay in being queued in command queue 142 (FIG. 1). The delay in being queued may be a result of a delay at a local controller interface or an insufficient amount of memory space in command queue 142. The delay at a local controller interface may be caused by a delay in generating a user command by first or second master device 106 and/or sending by first or second master device 106 the user command to memory controller 110 via a respective local controller interface. The insufficient amount of memory space is a result of a delay by memory controller 110 in retiring a user command in command queue 142 (FIG. 1). A command contention delay is a result of another memory controller command being issued by memory controller 110 to physical layer 112 during the same clock cycle in which a memory controller command is being issued to physical layer 112.

Each set t0, t1, t2, and t3 of timers also includes an activate command delay timer that measures an activate command delay. The activate command delay includes a precharge-to-activate delay ($t_{RP}$), an activate-to-activate delay per bank ($t_{RC}$), an activate-to-activate delay different bank delay per rank ($t_{RRD}$), an n activate window delay (FAW), a can't lookahead to block contention delay, a command contention delay, or a combination of the delays, where n is an integer, such as three or four. The activate command delay timer includes a can't lookahead to block contention unit that measures the can't lookahead to block contention delay.

A precharge-to-activate delay does not cause a loss in efficiency of memory controller 110 in reading from or writing to memory bank 128. A precharge-to-activate delay is a time period between issuing, by memory controller 110, a precharge command by converting a user command and issuing an activate command, by memory controller 110, by converting another user command, where in between the precharge and activate commands, there is no other precharge or activate commands. An activate-to-activate delay per bank is a time period between issuing, by memory controller 110, an activate command from a user command and issuing another activate command from another user command to activate the same memory bank 128, where in between the two activate commands, there is no other activate command issued by memory controller 110. The activate-to-activate different bank delay per rank includes a time period between issuing, by memory controller 110, an activate command from a user command to activate memory bank 128 of memory rank 126 and issuing, by memory controller 110, an activate command generated from a user command to activate a different memory bank 128 of the same memory rank 126, where in between the two activate commands, there is no other activate command.

The n activate window delay is a time period, such as four or six clock cycles, in which there cannot be more than n activate commands issued by memory controller 110.

Moreover, each set t0, t1, t2, and t2 of timers includes a read/write command delay timer that measures a read or write command delay. The read or write command delay includes an activate-to-read/write delay ($t_{RCD}$), a write-to-read delay ($t_{CWL}+t_{WTR}$), a read-to-write delay ($t_{CL}-t_{CWL}$), an auto-precharge mode delay, or a combination of the delays. The activate-to-read/write delay is a time period between issuing, by memory controller 110, an activate command from a user command and issuing, by memory controller 110, a read or write command from the user command, where in between the activate and read or write commands, memory controller 110 does not issue another read, write, and activate command. An activate-to-read/write delay does not cause an efficiency loss in memory controller 110 in reading from or writing to memory bank 128.

A write-to-read delay is a time period between issuing, by memory controller 110, a write command from a user command to write to memory bank 128 of memory rank 126 and issuing, by memory controller 110, a read command from another user command to read data from memory bank 128 of same or another memory rank 126, where in between the write and read commands, another write or read command is not issued by memory controller 110. A read-to-write delay is a time period between issuing, by memory controller 110, a read command from a user command to read from memory bank 128 of memory rank 126 and issuing, by memory controller 110, a write command from another user command to write data to memory bank 128 of same or another memory rank 126, where in between the read and write commands, another write or read command is not issued by memory controller 110.

An auto-precharge mode delay is a delay between issuing a first read or write command to a row of memory bank 128 and issuing a second read or write command to the same row caused by issuing an activate command between the first read or write command and the second read or write command. An enablement or disablement of the auto-precharge mode is indicated by a user command.

System 500 includes one register set for each set t0, t1, t2, and t3 of timers. For example, register set RS0 stores a status of a precharge command delay, an activate command delay, and/or a read/write command delay for set t0 and register set RS3 stores a status of a precharge command delay, an activate command delay, and/or a read/write command delay for set t3. A status of a delay, such as a precharge command delay, an activate command delay, or a read/write command delay is whether the delay meets a timing requirement. Register sets for sets t1 and t2 of timers are not shown in FIG. 5.

A register set stores a timer exception vector, which is a status of a precharge command delay, an activate command delay, and/or a read/write command delay for a user command. For example, register set RS0 stores a timer exception vector for user command 0 and register set RS3 stores a timer exception vector for user command 3.

Figure 6:
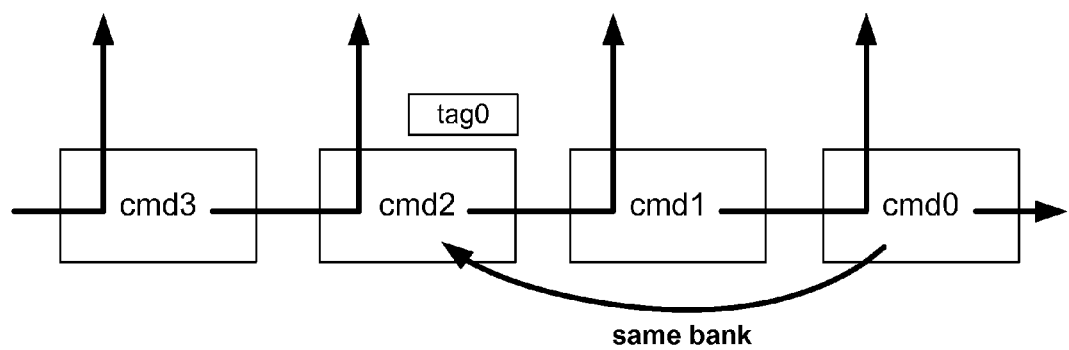
FIG. 6 is a block diagram of an embodiment of a command queue that includes the user commands.

FIG. 6 is a block diagram of an embodiment of command queue 142 (FIG. 1) that includes user commands 0, 1, 2, and 3. In addition to generating a tag by extracting information from a user command, memory controller 110 determines status of the user command, such as whether the user command is stalled, such as delayed, beyond a timing requirement input via the input device, described below, by the user. Upon determining that a user command from which a tag is generated is stalled, memory controller 110 determines a stall reason for the stall of the user command, stores a reason tag generated from the same or another user command that causes the stall, and associated the reason tag with the tag. For example, upon receiving an activate command delay or a precharge command delay is a result of a can't lookahead to block contention delay received from set t2 of timers, memory controller 110 determines that the can't lookahead to block contention delay is caused by a memory controller command generated from a user command 0, from which a tag 0 is generated. In this example, memory controller 110 determines that the can't lookahead to block contention delay is caused by the memory controller command generated from the user command 0 by determining that a can't lookahead to block contention unit within set t2 of timers has provided a bank contention output at a time the memory controller command is using memory bank 128. Additionally, in this example, memory controller 110 associates a reason tag with tag 2. Moreover, in this example, the tag 0 is the reason tag for an efficiency loss of memory controller 110.

As another example, upon receiving an activate command delay caused by an n activate window delay from timer t3, memory controller 110 determines that a reason for not issuing an activate command for user command 3 is that the issuance will not satisfy an n activate window requirement, which is a requirement to issue no more than n activate commands within a certain time period, input via the input device. This time period is an example of a timing requirement. In this example, memory controller 110 stores, within a storage device, tag 2 as a reason tag for stall of user command 3 and associates the reason tag with tag 3. Tag 2 is stored as a reason tag because tag 2 is generated to execute user command 2 and the user command 2 precedes user command 3. An activate command generated to execute user command 2 may have taken a clock cycle designated for issuing an activate command generated to execute user command 3 because user command 2 may be designated by first master device 104 or second master device 106 as taking priority over user command 3.

Examples of a stall reason for a stall of a user command includes a read/write to precharge command delay beyond a timing requirement, an activate-to-precharge command delay beyond a timing requirement, a can't lookahead to block contention delay causing a precharge command delay, a no valid command delay, a command contention delay, an activate-to-activate delay beyond a timing requirement per memory bank 128, an n activate window delay, a can't lookahead to block delay causing an activate command delay, a command contention delay causing an activate-to-activate delay beyond a timing requirement per memory rank 126, a write-to-read command delay beyond a timing requirement, a read-to-write command delay beyond a timing requirement, or an auto precharge mode delay. It is noted that all timing requirements mentioned herein are provided via the input device and that the precharge-to-activate delay and activate-to-read/write delay do not result in an efficiency loss of memory controller 110 and are not stall reasons for stall of a user command.

Figure 7:
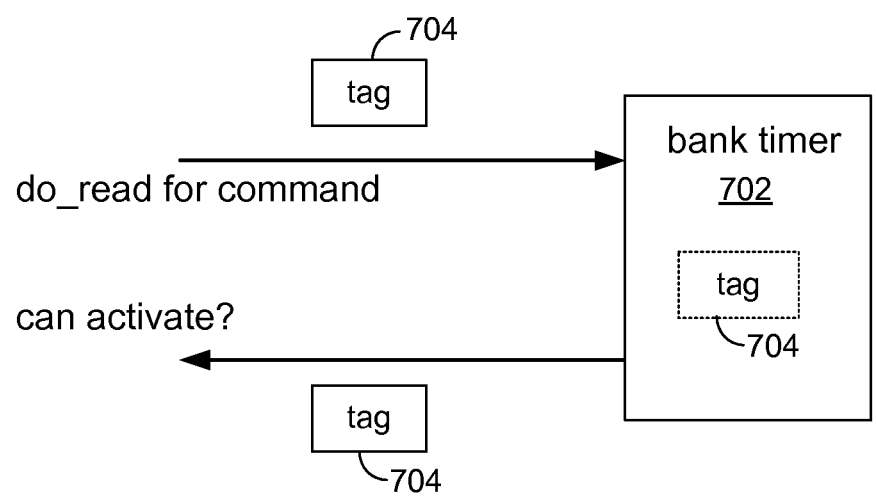
FIG. 7 is a block diagram of an embodiment of a bank timer, which is an example of any of timers used within the system of FIG. 1.

FIG. 7 is a block diagram of an embodiment of a bank timer 702, which is an example of any set t0, t1, t2, and t3 of timers for a user command. Bank timer 702 resets at a time a read, write, command, or activate command is issued by memory controller 110 for a user command and upon performance of the reset, the bank timer 702 receives and stores a tag 704 generated by extracting information from the user command and receives and stores a reason tag associated with the tag 704. Tag 704 may be tag 0, 1, 2, or 3 (FIG. 4).

Bank timer 702 outputs tag 704, a reason tag associated with the tag 704, a precharge command delay generated based on execution of a user command, an activate command delay generated based on execution of the user command, and/or a read/write command delay generated based on execution of the user command.

In another embodiment, upon determining, by memory controller 110, that there is no stall in executing a user command and accordingly no reason for the stall, the reason tag is not stored in memory controller 110.

Figure 8:
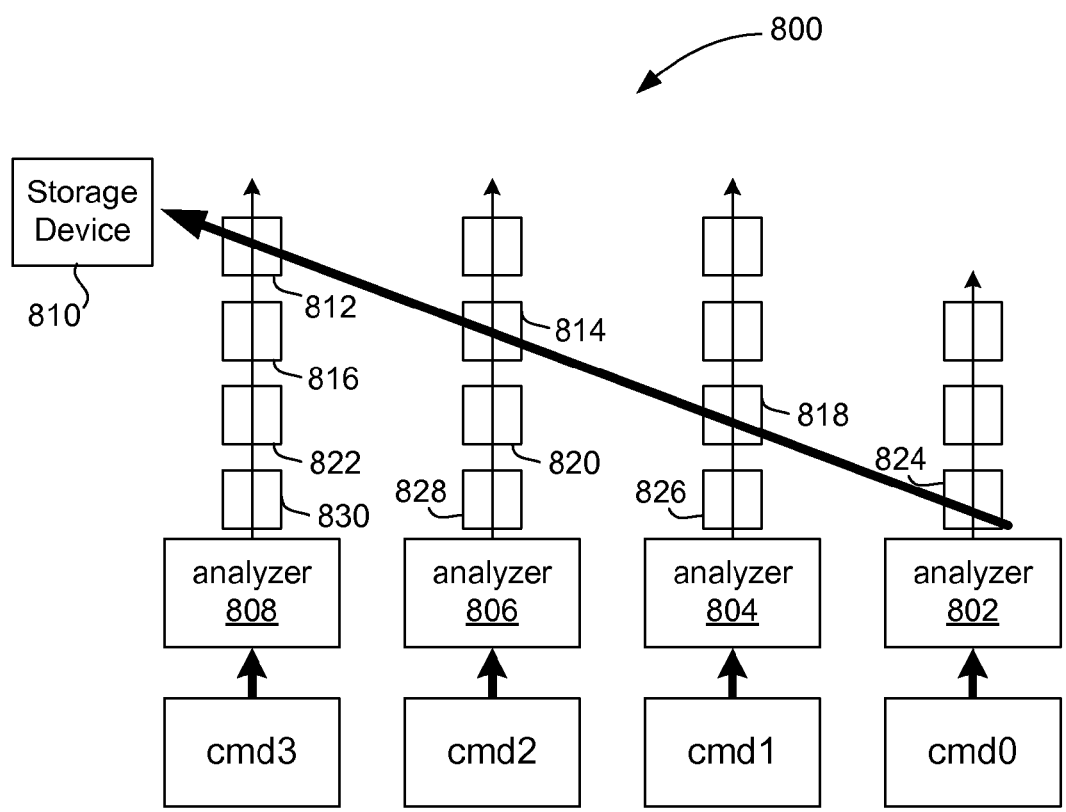
FIG. 8 is a block diagram of an embodiment of a system for real-time storage of analyzed information in a storage device of the system of FIG. 1.

FIG. 8 is a block diagram of an embodiment of a system 800 for real-time storage of analyzed information in a storage device. System 800 includes command queue 142, a plurality of analyzers 802, 804, 806, and 808, and a storage device 810. Storage device 810 may be a plurality of registers, such as a FIFO. Storage device 810 and analyzers 802, 804, 806, and 808 are part of memory controller monitor 130 (FIG. 1).

Each set t0, t1, t2, and t3 of timers outputs tag 704 (FIG. 7), a reason tag, and a precharge command delay generated during execution of a user command, an activate command delay generated during execution of the user command, or a read/write command delay generated during execution of the user command to an analyzer for analysis of the user command during a clock cycle. For example, during a clock cycle in which analyzer 806 analyzes a user command 2, set t2 of timers outputs a tag 2 for the user command 2, reason tag, such as tag 0, a precharge command delay that is a delay in issuing a precharge command from the user command 2, an activate command delay that is a delay in issuing an activate command from the user command 2, or a read/write command delay that is a delay in issuing a read or write command from the user command 2 to the analyzer 806.

An analyzer analyzes an output received from set t0, t2, t2, or t3 of timers and a status received from memory controller 110 of a user command to generate an analyzed output during a clock cycle. As an example, analyzer 806 generates an analyzed output including a reason tag, such as tag 0, for user command 2, a tag 2 for user command 2, and a stall vector upon receiving the reason tag, the tag 2, a status of the user command 2, and the stall reason for stall of the user command. The stall vector is a condensed reason identifying a stall reason that user command 2 is stalled, such as delayed, because of user command 0. For example, the stall vector is a code, such as a letter, number, a group of letters, a group of numbers, or a combination of one or more letters and one or more numbers that identifies the reason behind the stall of user command 2.

An analyzed output is generated in real-time during each clock cycle by an analysis performed for each user command. For example, during a first clock cycle, analyzer 808 that is analyzing user command 0 receives a status from memory controller 110 and an output from set t0 of timers to output an analyzed output 812, and analyzers 802, 804, and 806 do not analyze any user command. During a second clock cycle, analyzer 806 that is analyzing user command 0 receives a status of the user command 0 from memory controller 110 and an output of the user command 0 from set t0 of timers, and analyzes the user command 0 to output an analyzed output 814 during the second clock cycle. Moreover, during the second clock cycle, analyzer 808 that analyzes user command 1 receives a status of the user command 1 from memory controller 110 and output of the user command 1 from set t1 of timers, and analyzes the user command 1 to output an analyzed output 816. Furthermore, during the second clock cycle, analyzers 802 and 804 do not analyze any user command.

During a third clock cycle, analyzer 804 that analyzes user command 0 receives a status of the user command 0 from memory controller 110 and an output of the user command 0 from set t0, and analyzes the user command 0 to output an analyzed output 818. Moreover, during the third clock cycle, analyzer 806 that analyzes user command 1 receives a status of the user command 1 from memory controller 110 and an output of the user command 1 from set t1 of timers, and analyzes the user command 1 to output an analyzed output 820. Further, during the third clock cycle, analyzer 808 that analyzes user command 2 receives a status of the user command 2 from memory controller 110 and an output of the user command 2 from set t2, and analyzes the user command 2 to output an analyzed output 822. Furthermore, during the third clock cycle, analyzer 802 does not analyze any user command.

During a fourth clock cycle, analyzer 802 that analyzes user command 0 receives a status of the user command 0 from memory controller 110 and an output of the user command from set t0 and analyzes the user command 0 to output an analyzed output 824. Moreover, during the fourth clock cycle, analyzer 804 that analyzes user command 1 receives a status of the user command 1 from memory controller 110 and an output of the user command 1 from set t1 of timers, and analyzes the user command 1 to output an analyzed output 826. Further, during the fourth clock cycle, analyzer 806 that analyze user command 2 receives a status of the user command 2 from memory controller 110 and an output of the user command from set t2, and analyzes the user command 2 to output an analyzed output 828. Additionally, during the fourth clock cycle, analyzer 808 that analyzes user command 3 receives a status of the user command 3 from memory controller 110 and an output of the user command 3 from set t3 of timers, and analyzes the user command 3 to output an analyzed output 830.

Storage device 810 receives and stores analyzed outputs 812, 814, 818, and 824. Accordingly, analyzed outputs 812, 814, 818, and 824 are collected and stored in real time by storage device 810. System 800 includes another storage device (not shown) that similarly receives and stores analyzed outputs 816, 820, 826, and another analyzed output.

In another embodiment in which a stall reason is not generated by memory controller 110, an analyzer does not receive the stall reason.

Figure 9:
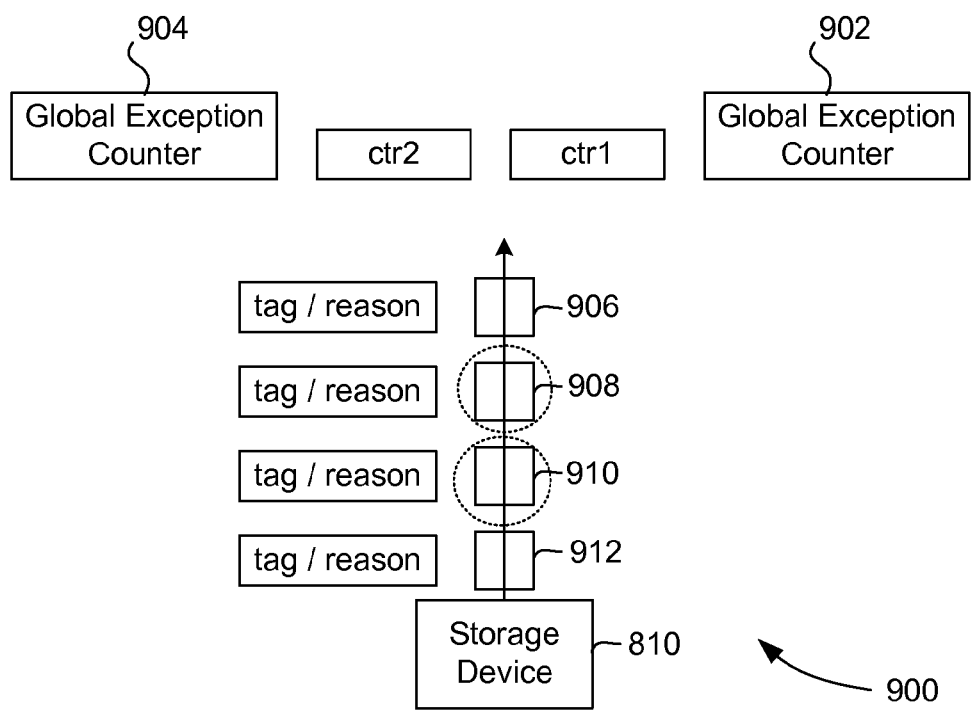
FIG. 9 is a block diagram of an embodiment of a system for counting a number of clock cycles for a particular syndrome, such as a class, of the user commands.

FIG. 9 is a block diagram of an embodiment of a system 900 for counting a number of clock cycles for a particular syndrome, such as a class. System 900 includes storage device 810 (FIG. 8), a plurality of counters ctr 1 and ctr 2, and a plurality of global exception counters 902 and 904. Each of counter ctr 1, counter ctr 2, global exception counter 902, and global exception counter 904 includes a random access memory (RAM). Storage device 810 outputs a plurality of storage device outputs 906, 908, 910, and 912. Storage device output 906 is analyzed output 812, storage device output 908 is analyzed output 814, storage device output 910 is analyzed output 818, and storage device output 912 is analyzed output 824.

A counter ctr 1, a counter ctr 2, or both counters ctr 1 and ctr2 count a number of efficiency loss cycles for a particular syndrome. For example, counter ctr 1 counts a number of efficiency loss cycles for storage outputs 908 and 910 that may have the same stall vector and does not count a number of clock cycles for storage outputs 906 and 912 that have different stall reasons than that of the stall vector of storage outputs 908 and 910. Similarly, counter ctr 2 counts a number of cycles for a number of storage outputs having stall vectors different than stall vectors of storage outputs 908 and 910. In another embodiment, multiple counters, such as more than two counters, count a number of efficiency loss cycles for a particular syndrome.

In another embodiment, counter ctr 1 counts a number of cycles for storage outputs having any number, such as two or three, of classes of stall vectors.

At a time, counter ctr 1 or ctr 2 starts counting a number of clock cycles of stored outputs for a user command, the user command is retired from command queue 142 (FIG. 1) by memory controller 110. A global exception counter counts a number of occurrences of each timer exception vector for a user command. For example, global exception counter 902 counts a number of timer exception vectors stored within register set RS0 for user command 0 and the number is a latency of the user command. Global exception counter 904 counts a number of occurrences of timer exception vectors and the number is a change in latency that result in an efficiency loss of memory controller 110, and global exception counter 904 does not count the remaining timer exception vectors that do not result in the efficiency loss of memory controller 110 but result in a latency of memory controller 110.

The trace logger of first local controller interface monitor 132 or second local controller interface monitor 134 is connected to global exception counters 902 and 904, and determines whether there is an efficiency loss based on the timer exception vectors counter by the global exception counters 902 and 904.

Figure 10:
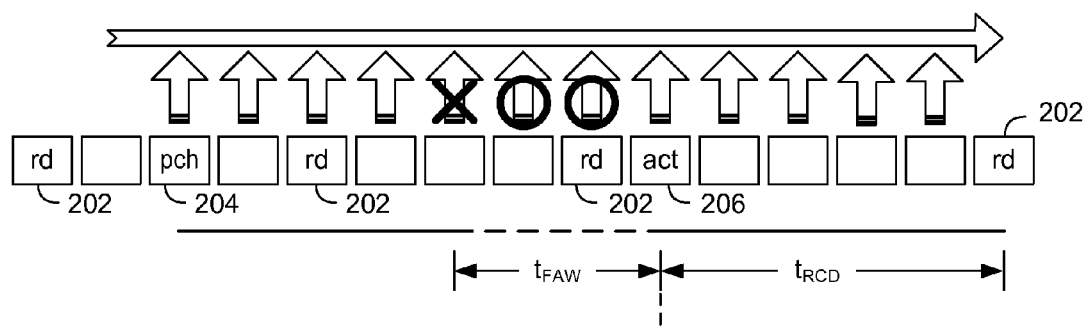
FIG. 10 is a block diagram of an embodiment of a method illustrating placing a limit on counting a number of clock cycles for a syndrome.

FIG. 10 is a block diagram of an embodiment of a method illustrating placing a limit on counting a number of clock cycles for a syndrome. Although a number of clock cycles of a syndrome, such as an n activate window delay, is m, such as three or four, counter ctr 1 and ctr 2 (FIG. 9) counts m-p, such as two or three, most recent cycles instead of m for the syndrome. The p clock cycles do not affect efficiency of memory controller 110. The value of p is provided by the user via the input device.

In yet another embodiment, each counter ctr 1 or ctr 2 counts all m clock cycles.

Referring back to FIG. 1, debug master device 114 gathers information output from local controller interface monitors 132 and 134, physical interface monitor 136, and memory controller monitor 130 via collection bus 138, and outputs the information to hub 116 via network 140 and/or JTAG. For example, debug master device 114 collects outputs of counters ctr 1 and ctr 2, global exception counters 902 and 904, and/or storage device 810 (FIG. 9), and sends the information to hub 116 via network 140. As another example, debug master device 114 collects storage device outputs of storage device 810 (FIG. 9), a count of counter ctr 1 (FIG. 9) for a syndrome, a count of counter ctr 2 (FIG. 9) for another syndrome, a count of global exception counter 902 (FIG. 9) for a user command, a count of global exception counter 904 (FIG. 9) for the user command, and transmits the storage device output and the counts to hub 116 via network 140.

Hub 116 receives information from debug master device 114 and decodes the information to determine a cause of an efficiency loss within performance debug interface 102 (FIG. 1). Examples of the cause of efficiency loss include the stall reasons for efficiency loss of memory controller 110 and/or unavailability of first and/or second master device 106.

Hub 116 receives information sent by debug master device 114 and determines whether to display the information in a graphical user interface (GUI) or in a non-GUI format, such as a text format. For example, upon receiving an instruction from the user via the input device, hub 116 determines to display information received from debug master device 114.

Figure 11:
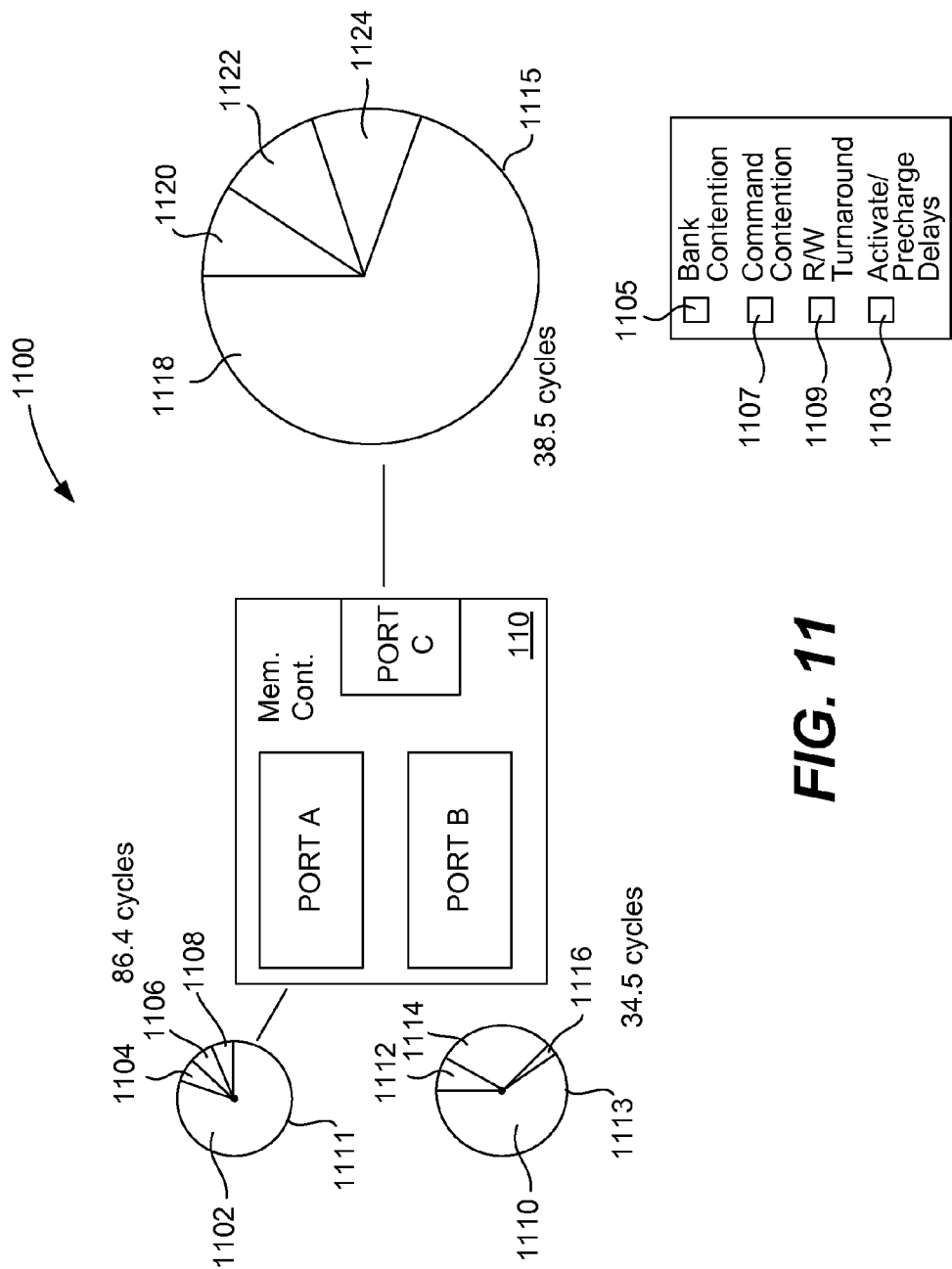
FIG. 11 is a diagram of an embodiment of a graphical user interface (GUI) generated by a hub of the system of FIG. 1 and displayed by an output device.

FIG. 11 is a diagram of an embodiment of a GUI 1100 determined to be generated by hub 116 (FIG. 1) and displayed by an output device, described below, connected to the hub 116. Hub 116 receives information from debug master device 114, decodes the information to obtain an average change in latency resulting in an efficiency loss over a period of time at each of port A and port B of memory controller 110 and an average change in latency caused resulting in an efficiency loss at port C of memory controller 110 over a period of time. As an example, a change in latency occurring within memory controller system 144 (FIG. 1) is provided by hub 116 by decoding information, received from debug master device 114, including a plurality of outputs of global exception counter 904 (FIG. 9) for a user command. As another example, an average change in latency at port A of memory controller 110 is determined by hub 116 by decoding information, received from debug master device 114, including a plurality of outputs of global exception counter 904 (FIG. 9) for a plurality of user commands associated with a tag identifying the port A, and averaging the plurality of outputs over a period of time. As yet another example, an average change in latency at port B of memory controller 110 is determined by hub 116 by decoding information, received from debug master device 114, including a plurality of outputs of global exception counter 904 (FIG. 9) for a plurality of user commands associated with a tag identifying the port B, and averaging the plurality of outputs over a period of time. As another example, an average change in latency at port C is a average of average changes in latency at ports A and B over a period of time.

Moreover, hub 116 also decodes information received from debug master device 114 to determine to display graphically one or more stall reasons causing the average change in latency of memory controller 110. For example, hub 116 determines to display that out of 86.4 cycles of average change in latency at port A of memory controller 110, a portion 1102 of a pie 1111 is attributable to a plurality of activate or precharge delays 1103, another portion 1104 of pie 1111 is attributable to can't lookahead to block contention delays 1105, yet another portion 1106 of pie 1111 is attributable to a command contention delays 1107, and another portion 1108 of pie 1111 is attributable to read-to-write delays 1109, and upon receiving the determination to display, the output device displays one or more stall reasons. As another example, hub 116 determines to display that out of 34.5 cycles of average change in latency at port B of memory controller 110, a portion 1110 of a pie 1113 is attributable to a plurality of activate or precharge delays 1103, another portion 1112 of pie 1113 is attributable to can't lookahead to block contention delays 1105, yet another portion 1114 of pie 1113 is attributable to command contention delays 1107, and another portion 1116 is attributable to read-to-write delays 1109, and upon receiving the determination, the output device displays one or more stall reasons. As yet another example, hub 116 determines to display and that out of 38.5 cycles of average change in latency at port C of memory controller 110, a portion 1118 of a pie 1115 is attributable to a plurality of activate or precharge delays 1103, another portion 1120 of pie 1115 is attributable to can't lookahead to block contention delays 1105, yet another portion 1122 of pie 1115 is attributable to command contention delays 1107, and another portion 1124 is attributable to read-to-write delays 1109, and upon receiving the determination, the output device displays one or more stall reasons. The output device is connected to hub 116 that generates a determination and the output device displays upon receiving the determination to display from hub 116.

In another embodiment, hub 116 determines to display and the output device displays a change in latency for a user command, instead of average change in latency, of memory controller 110 and a change in latency, for a user command, instead of an average change in latency, at each port A, port B, and port C of memory controller 110.

Figure 12:
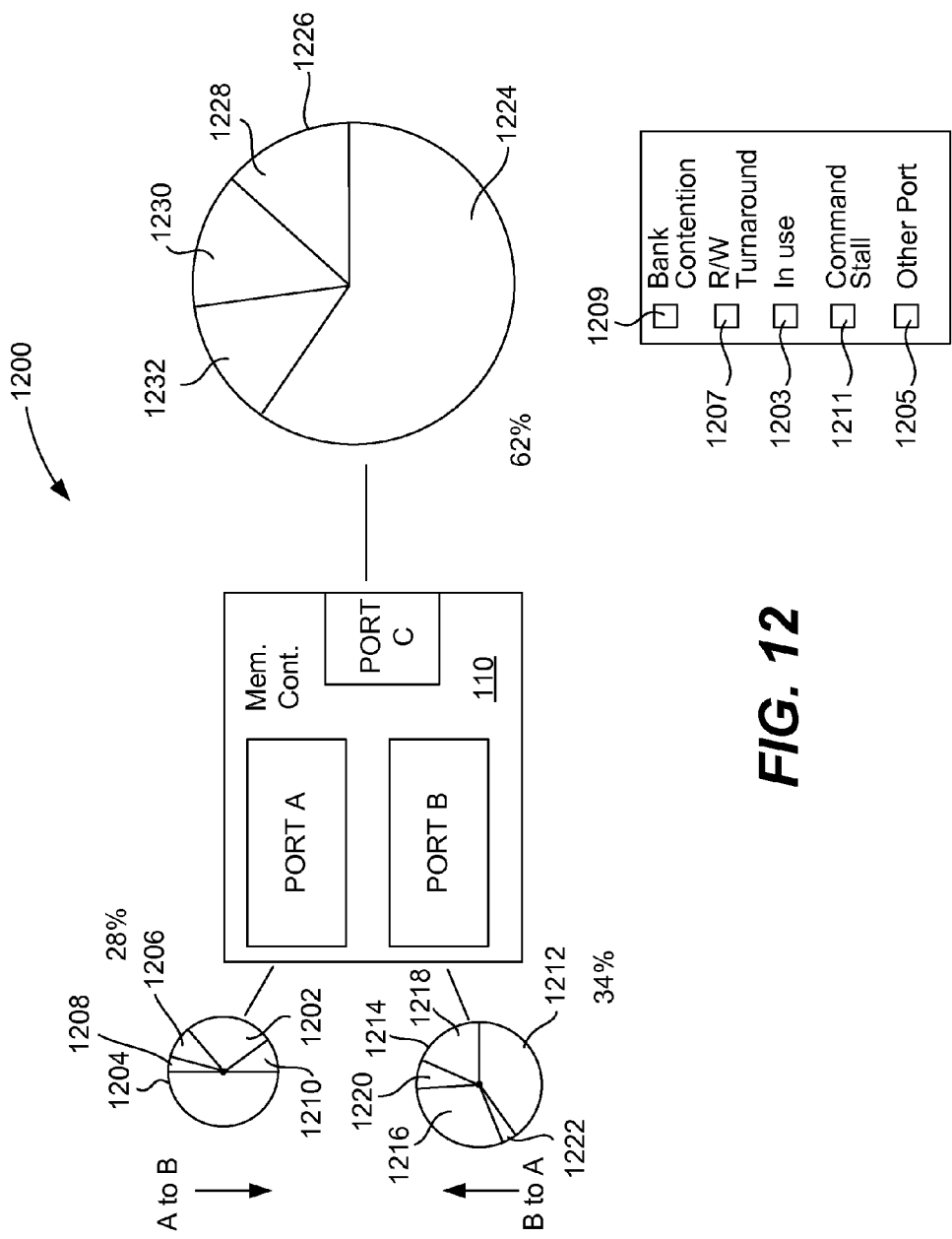
FIG. 12 is a diagram of an embodiment of another GUI generated by the output device.

FIG. 12 is a diagram of an embodiment of a GUI 1200 determined, by hub 116 (FIG. 1), to be generated and displayed by the output device. Hub 116 receives information from debug master device 114, decodes the information to obtain efficiency losses at ports A and B and an efficiency loss at port C of memory controller 110. For example, hub 116 determines to display an efficiency at port C of memory controller 110 as 62% and an efficiency at port A of memory controller 110 to be 28%, and the output device displays the efficiencies. As another example, hub 116 to display an efficiency at port B of memory controller 110 to be 34%. In this example, the efficiency is displayed on the output device. Efficiency loss is a loss from an efficiency of 100%. In addition, hub 116 determines to display a plurality of stall reasons for the loss in efficiency at ports A, B, and C of memory controller 110 and the stall reasons are displayed by output device.

As yet another example, hub 116 determines to display and the output device displays a portion 1202 of a pie 1204, representing an efficiency of usage 1203 of port A, another portion 1206 of pie 1204, representing an efficiency loss at port A as a result of use and efficiency loss 1205 at port B, yet another portion 1206, of pie 1204, of efficiency loss attributable to a read-to-write delay 1207, where the read is performed to execute a user command received from port B of memory controller 110 and the write is performed to execute a user command received from port A of memory controller 110. Moreover, hub 116 determines to display a portion 1208, of pie 1204, of efficiency loss attributable to a can't lookahead to a block contention delay 1208 at port A of memory controller 110 and another portion 1210, of pie 1204, of efficiency loss attributable to a command contention delay 1211 at port A of memory controller 110, and the output device displays the portions 1208 and 1210.

As still another example, hub 116 determines to display a portion 1212 of a pie 1214, representing an efficiency of usage 1203 of port B, another portion 1216 of pie 1214, representing an efficiency loss at port B as a result of use and efficiency loss 1205 at port A, yet another portion 1218 of efficiency loss attributable to a read-to-write delay 1207, where the read is performed to execute a user command received from port A of memory controller 110 and the write is performed to execute a user command received from port B of memory controller 110. In this example, the output device displays the portions 1212, 1216, and 1218. Moreover, hub 116 determines to display a portion 1220 of efficiency loss attributable to a can't lookahead to block contention delay 1209 at port B of memory controller 110 and another portion 1222 of efficiency loss attributable to a command contention delay 1211 at port B of memory controller 110. The output device displays the portions 1220 and 1222. Portions 1218, 1220, and 1222 are portions of pie 1214.

As another example, hub 116 determines to display a portion 1224 of a pie 1226, representing an efficiency of usage 1203 at port C of memory controller 110, yet another portion 1228 of efficiency loss attributable to a read-to-write delay 1207 at port C, where the read is performed to execute a user command received from port A or port B of memory controller 110 and the write is performed to execute a user command received from the other port A or B of memory controller 110. The output device displays the portions 1224 and 1228. Moreover, hub 116 determines to display a portion 1230 of efficiency loss attributable to a can't lookahead to block contention delay 1209 at port C of memory controller 110 and another portion 1232 of efficiency loss attributable to a command contention delay 1211 at port C of memory controller. Portions 1228, 1230, and 1232 are portions of pie 1226. The output device displays the portions 1230 and 1232.

By presenting efficiencies at ports A and B, GUI 1200 also presents a breakdown of efficiency losses caused by switching between ports A and B. By looking at GUI 1200, a user may decide to re-design a priority of user commands in command queue 142 (FIG. 1) or a sequence of user commands in command queue 142. For example, the user may move user command 0 to a location of user command 1 and move user command 1 to a location of user command 0 so that the user command 1 is executed earlier in time than the user command 0. The user may add or alternatively improve an external arbitration scheme used by first and second master devices 104 and 106 to access port A and/or port B.

It is noted that an efficiency at port C is the same as the sum of efficiencies at ports A and B of memory controller 110.

In another embodiment, hub 116 receives information from debug master device 114 to determine to generate a text file including table A, shown below. A text file is displayed by the output device.

TABLE A

| System Tag Summary | |
|---|---|
| Read | 15.23% |
| Write | 18.16% |
| Total Efficiency | 33.39% |
| Command Bus Contention | 6.43% |
| Wait to Issue Activate | 50.34% |
| Wait to Issue Precharge | 3.08% |
| Data Bus Contention | 0.16% |
| Potential Data Reorder | 0.61% |
| Wait to Issue Read/Write | 3.69% |
| Bank Contention | 1.36% |
| Command Queue Empty | 4.29% |

Table A shows an efficiency and efficiency loss at port A and/or port B of memory controller 110 over a plurality of user commands including a user command to write to memory bank 128 and a user command to read from memory bank 128. An efficiency of executing a user command to read from memory bank 128 is 15.23% by executing a user command and to write to memory bank 128 by executing another user command is 18.16%. In performing a read or a write to memory device 108 (FIG. 1), hub 116 determines, from information received from debug master device 114, that there is a loss in efficiency of 6.43% attributable to a stall reason of contention between two user commands at one or both ports A and B to execute a read and write operation, an efficiency loss of 50.34% attributable to a stall reason of an activate delay, an efficiency loss of 3.08% attributable to a stall reason of a precharge delay, and efficiency loss of 0.16% attributable to a stall reason of contention between two memory controller commands at port C, an efficiency loss of 0.61% attributable to a stall reason of a lack of reorder of memory controller commands by memory controller 110, an efficiency loss of 3.69% attributable to a stall reason of a read or write delay, an efficiency loss of 1.36% attributable to a stall reason of can't lookahead to block contention delay, and an efficiency loss of 4.29% attributable to a stall reason of command queue 142 being empty.

Moreover, hub 116 receives information from debug master device 114, and generates efficiency and efficiency losses for a particular user command from which a tag, such as tag 0, is generated by extracting information. For example, hub 116 generates efficiency and efficiency losses in executing a user command to read data from memory bank 128 and from which tag 0 is generated, and the efficiency and efficiency losses are displayed on the output device.

TABLE B

Details for Tag 0, read

| | |
|---|---|
| Read | 15.23% |
| Command Bus Contention | 2.69% |
| Wait to Issue Activate | 16.17% |
| Wait to Issue Precharge | 2.34% |
| Data Bus Contention | 0.12% |
| Potential Data Reorder | 0.43% |
| Wait to Issue Read | 0.68% |
| Loss caused by read | 0.61% |

As shown in Table B, hub 116 determines that an efficiency of executing of a user command, from which tag 0 is generated is 15.23%. As shown in Table B, this user command is to read data from memory bank 128. Moreover, as shown in Table B, hub 116 determines that a loss in efficiency during execution of the user command is attributable to a stall reason of contention of the user command for usage of first local controller interface 122 (FIG. 1) with another user command is 2.69%. Further, as shown in Table B, hub 116 determines that a loss in efficiency during execution of the user command attributable to a stall reason of contention of an activate delay is 16.17%, to a stall reason of a precharge command delay is 2.34%, to a stall reason of contention of a memory controller command with another memory controller command for use of port C is 0.12%, to a stall reason of lack of reordering of memory controller command issued by memory controller 110 (FIG. 1) is 0.43%, to a stall reason of a read command delay is 0.68%, and to a stall reason of a can't lookahead to block contention delay is 0.61%. Hub 116 generates and determines to display a sum of efficiency losses in executing a user command to read data from memory bank 128 equal to 22.18%. The sum of efficiency losses are displayed on the output device.

The user views a GUI, such as GUI 1100 (FIG. 11), GUI 1200 (FIG. 12), and/or a text file, such as the text file represented by Table A or Table B, generated by hub 116 to further interpret a stall reason. As an example, in case a stall reason of can't lookahead to block contention delay, a stall reason of an activate-to-activate delay, or a stall reason of read/write/activate-to-precharge delay is viewed, via a GUI or text file, by the user, the user interprets that the stall reason implies that two accesses of data to different rows of the same memory bank 128 occurred within a short period of time and decides to check port IDs of the accesses to further decide whether the accesses generated based on the user commands are received via port A and/or port B. As yet another example, in case a stall reason of an activate-to-activate different bank delay or an n activate window delay is viewed, via a GUI or text file, by the user, the user may interpret that a limitation on performance of memory controller 110 can be mitigated by increasing a length of data access to an open, such as activated row of memory bank 128. As another example, in case of a stall reason of a read-to-write delay for memory rank 126 or a write-to-read delay for memory rank 126 is viewed, via a GUI or text file, by the user, the user interprets that the delay is caused by the switching between read and write and that the delay can be mitigated. The delay can be mitigated by reordering user commands within command queue 142 (FIG. 1) or memory controller commands issued by memory controller 110 to coalesce data accesses to memory rank 126. As still another example, in case of a stall reason of an auto-precharge mode delay viewed, via a GUI or text file, by the user, the user interprets that use of the auto-precharge mode resulting in re-activation of memory bank 128 causes an efficiency loss.

Figure 13:
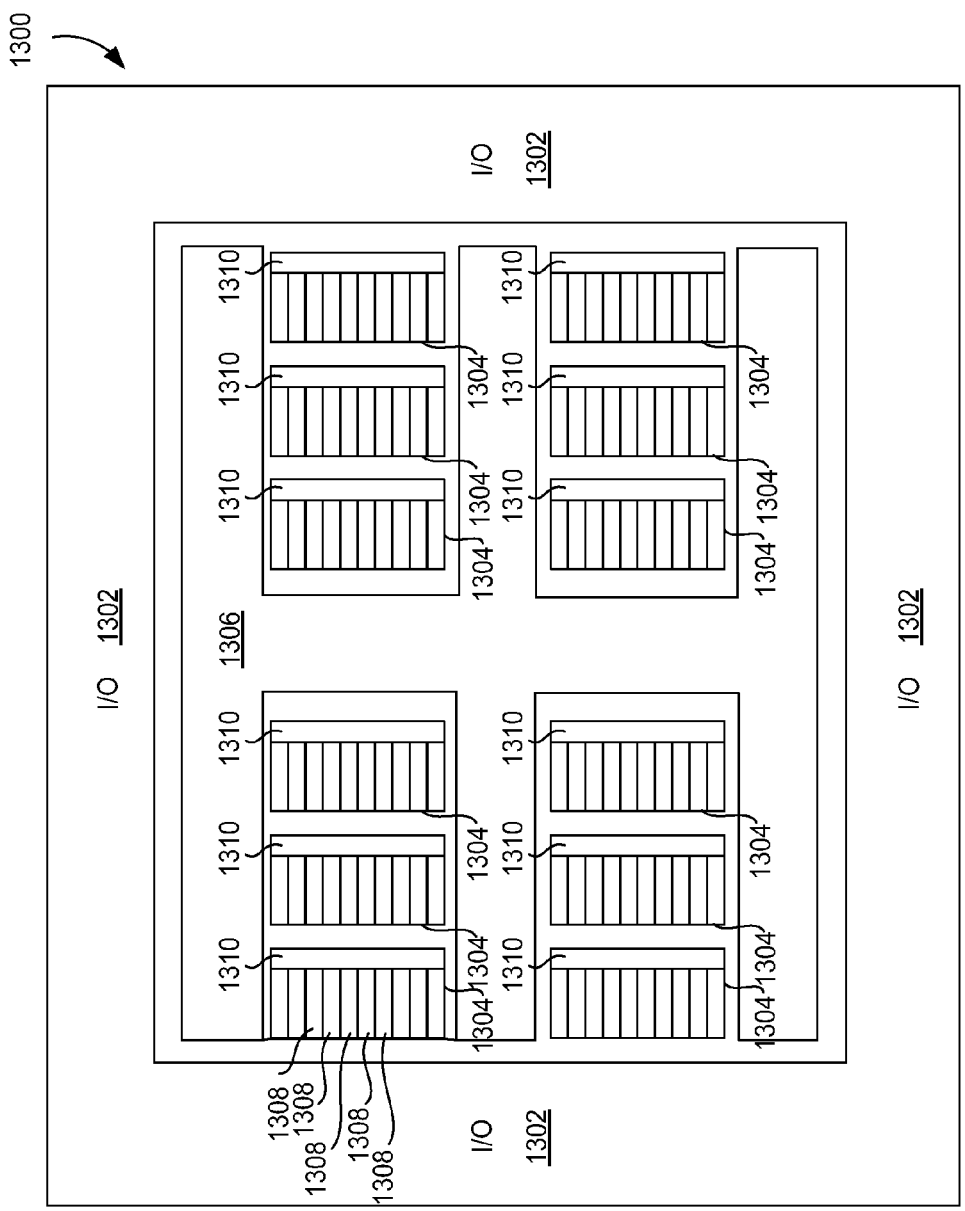
FIG. 13 is a block diagram of an embodiment of a programmable logic device (PLD) in which various portions of the system of FIG. 1 are embedded.

FIG. 13 is a block diagram of an embodiment of a programmable logic device (PLD) 1300, such as a field programmable gate array (FPGA). Each of first master device 104, second master device 106, first and second local controller interfaces 122 and 124, memory controller 110, monitors 130, 132, 134, and 136, physical layer 112, debug master device 114, physical interface 118, connection bus 138, and memory interface 120 (FIG. 1) are embedded within PLD 1300. PLD 1300 includes a plurality of input/output (I/O) devices 1302 and a plurality of logic array blocks (LABs) 1304 connected to the I/O devices 1302. One LAB 1304 is connected to another LAB 1304 via programmable routing and one or more LAB lines 1306.

Each LAB 1304 includes a plurality of logic elements (LEs) 1308, which can be implemented as memory or logic. Each LE 1308 can be flexibly configured to include one or more lookup tables (LUTs). LEs 1308 are connected via a plurality of local lines 1310.

Figure 14:
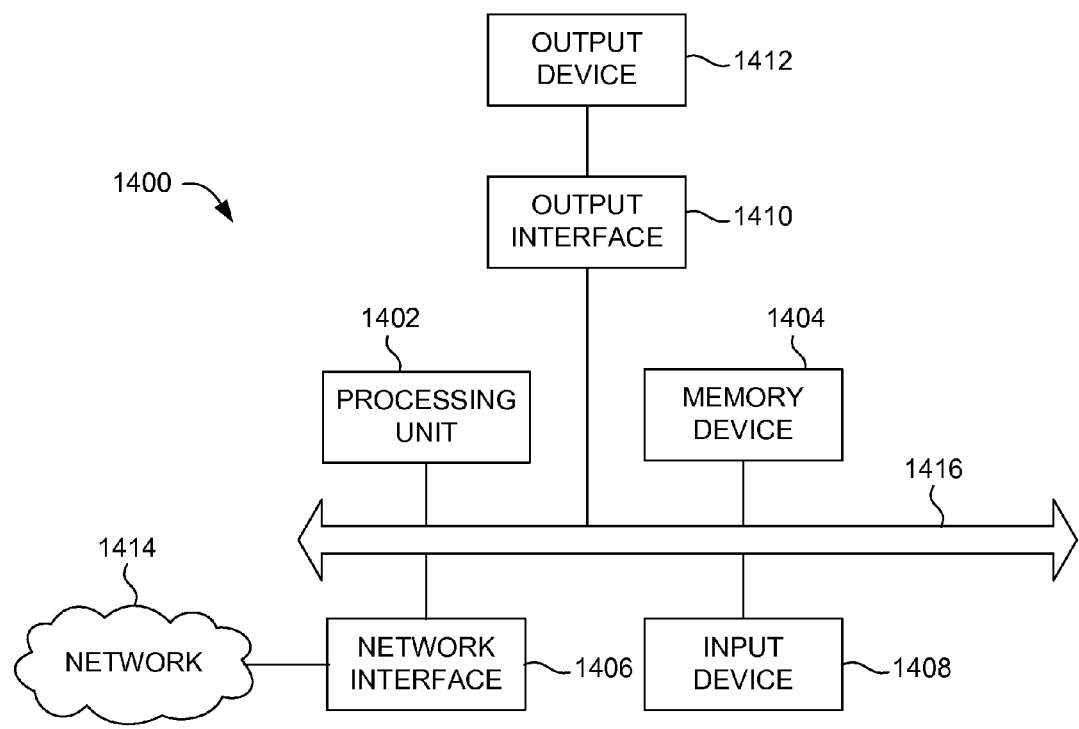
FIG. 14 is a block diagram of a system used to generate a design of the PLD.

FIG. 14 is a block diagram of a system 1400 that is used to generate a design of PLD 1300 (FIG. 13). System 1400 includes a processing unit 1402, a memory device 1404, a network interface 1406, an input device 1408, an output interface 1410, and an output device 1412. System 1400 is an exemplary computing device. For example, system 1400 may be a computer, such as a personal computer, a desktop, or a laptop.

Processing unit 1402 may be a central processing unit (CPU), the processor, a microprocessor, a hardware controller, a microcontroller, a programmable logic device programmed for use as a controller, a network 140 controller, or other processing unit. Memory device 1404 may be a RAM, a read-only memory (ROM), or a combination of RAM and ROM. For example, memory device 1404 includes a computer-readable medium, such as a floppy disk, a ZIP™ disk, a magnetic disk, a hard disk, a compact disc-ROM (CD-ROM), a recordable CD, a digital video disc (DVD), or a flash memory. Memory device 1404 stores a System on Programmable Chip (SOPC) Builder for designing PLD 1300.

Network interface 1406 may be a modem or a network interface card (NIC) that allows processing unit 1402 to communicate with a network 1414, such as a wide area network (WAN) or a local area network (LAN). Processing unit 1402 may be connected via a wireless connection or a wired connection to network 1414. Examples of the wireless connection include a connection using Wi-Fi protocol or a WiMax protocol. The Wi-Fi protocol may be an IEEE 802.11, IEEE 802.11a, IEEE 802.11b, IEEE 802.11g, or IEEE 802.11i protocol. Examples of input device 1408 include a mouse, a keyboard, a stylus, or a keypad.

Output device 1412 may be a liquid crystal display (LCD) device, a plasma display device, a light emitting diode (LED) display device, or a cathode ray tube (CRT) display device. Output device 1412 is connected to hub 114 (FIG. 1). Examples of output interface 1410 include a video controller that drives output device 1412 to display one or more images based on instructions received from processing unit 1402.

Processing unit 1402 may access the methods, described herein, for measuring and presenting performance data, from memory device 1404 or from a remote memory device (not shown), similar to memory device 1404, via network 1414, and executes the methods. Network 1414 may be the same as network 140 (FIG. 1). Processing unit 1402, memory device 1404, network interface 1406, input device 1408, output interface 1410, and output device 1412 communicate with each other via a bus 1416. In an alternative embodiment, system 1400 may not include network interface 1406. In various embodiments, output device 1412 displays a tag, which may be a reason tag.

Figure 15:
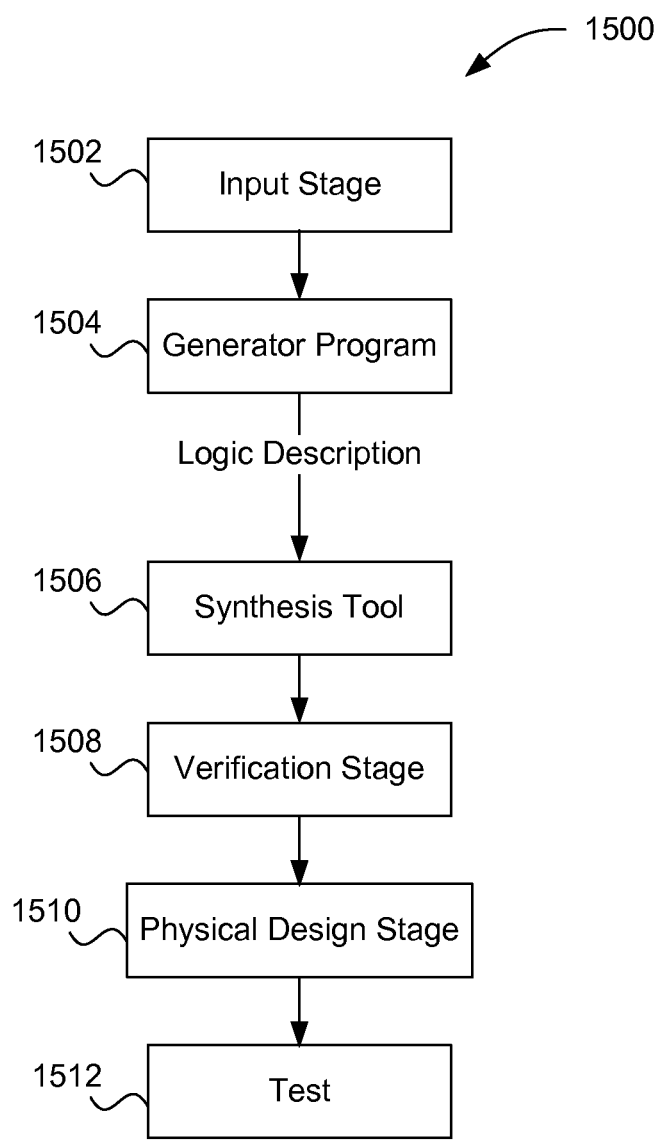
FIG. 15 is a diagrammatic representation showing a technique executed using the system of FIG. 14 to design the PLD of FIG. 13.

FIG. 15 is a diagrammatic representation showing a technique 1500 executed using system 1400 (FIG. 14) to design PLD 1300 (FIG. 13). An input stage 1502 receives selection information typically from the user for logic, such as, a processor core as well as other components such as a streaming output device to be implemented on PLD 1300 (FIG. 13). In one example, an input received is in the form of a high-level language program.

In one example, input stage 1502 often allows selection and parameterization of components to be used on PLD 1300 (FIG. 13). Input stage 1502 also allows configuration of variable or fixed latency support. In some examples, components provided to an input stage 1502 include intellectual property functions, megafunctions, and intellectual property cores. Input stage 1502 may be a GUI using wizards for allowing efficient or convenient entry of information. Input stage 1502 may also be a text interface or a program reading a data file such as a spreadsheet, database table, or schematic to acquire selection information. Input stage 1502 produces an output containing information about the various modules selected.

A generator program 1504 creates a logic description from information received via input stage 1502 and provides the logic description along with other customized logic to any of a synthesis tool 1506, place and route programs, and logic configuration tools to allow a logic description to be implemented on PLD 1300 (FIG. 13).

In typical implementations, generator program 1504 can identify the selections and generate a logic description with information for implementing the various modules. Generator program 1504 can be a Perl script creating Hardware Description Language (HDL) files, such as, Verilog™, Abel™, Very High Speed Integrated Circuit HDL (VHDL), and Altera™ HDL (AHDL) files, from the module information entered by the user.

Generator program 1504 also provides information to synthesis tool 1506 to allow HDL files to be automatically synthesized. In some examples, a logic description is provided directly by the user. Hookups between various components selected by the user are also interconnected by generator program 1504. Some of the available synthesis tools are Leonardo Spectrum™, available from Mentor Graphics™ Corporation of Wilsonville, Oreg. and Synplify™ available from Synplicity™ Corporation of Sunnyvale, Calif. The HDL files may contain technology specific code readable by synthesis tool 1506.

Input stage 1502, generator program 1504, and synthesis tool 1506 can be separate programs. The interface between the separate programs can be a database file, a log, or simply messages transmitted between the programs. For example, instead of writing a file to storage, such as memory device 1404 (FIG. 14), input stage 1502 can send messages directly to generator program 1504 to allow the generator program 1504 to create a logic description. Similarly, generator program 1504 can provide information directly to synthesis tool 1506 instead of writing HDL files. Similarly, input stage 1502, generator program 1504, and synthesis tool 1506 can be integrated into a single program.

The user may select various modules and an integrated program can then take the user selections and output a logic description in the form of a synthesized netlist without intermediate files. According to other embodiments, a logic description is a synthesized netlist such as an Electronic Design Interchange Format Input File (EDF file). An EDF file is one example of a synthesized netlist file that can be output by synthesis tool 1506.

Synthesis tool 1506 can take HDL files and output EDF files. Synthesis tool 1906 allows the implementation of the logic design on PLD 1300 (FIG. 13).

A verification stage 1508 typically follows an application of synthesis tool 1506. Verification stage 1508 checks the accuracy of the logic deign of PLD 1300 (FIG. 13) to ensure that an intermediate or final design realizes the expected requirements. Verification stage 1508 typically includes simulation tools, functional verification tools, and timing analysis tools for timing verification. Tools for simulation allow the application of inputs and the observation of outputs without having to implement PLD 1300 (FIG. 13). Simulation tools provide the user with cost effective and efficient mechanisms for both functional and timing verification of a design of PLD 1300 (FIG. 13). Functional verification involves the circuit's logical operation independent of timing considerations. Parameters such as gate delays are disregarded.

Timing verification involves the analysis of the design's operation with timing delays. Setup, hold, and other timing requirements for sequential devices, such as, flip-flops, within a design of PLD 1300, are confirmed. Some available simulation tools include Synopsys VCS™, VSS, and Scirocco™, available from Synopsys™ Corporation of Sunnyvale, Calif. and Cadence NC-Verilog™ and NC-VHDL™ available from Cadence Design Systems™ of San Jose, Calif.

After verification stage 1508, the synthesized netlist file can be provided to a physical design stage 1510 including the place and route phase and configuration tools. The place and route phase typically locates logic cells on specific logic elements of PLD 1300 (FIG. 13) and connects wires between the inputs and outputs of various logic elements of the PLD 1300 in accordance with logic required to implement an electronic design. PLD 1300 (FIG. 13) can also be physically tested at 1512.

For programmable logic devices, a programmable logic configuration stage can take the output of the place and route phase to program PLD 1300 (FIG. 13) with the user selected and parameterized modules. According to various embodiments, the place and route phase and the logic configuration stage are provided in a Quartus™ Development Tool, available from Altera™ Corporation.

As noted above, different stages and programs can be integrated in a variety of manners. According to one embodiment, input stage 1502, generator program 1504, synthesis tool 1506, verification stage 1508, and physical design stage 1510 are integrated into a single program, such as an SOPC Builder. The various stages are automatically run using system 1400 (FIG. 14) and transparent to the user. Technique 1500 can receive the user selected modules, generate a logic description depicting logic for implementing the various selected modules, and implement PLD 1300 (FIG. 13). As will be appreciated by one of skill in the art, HDL files and EDF files are mere examples of a logic description. Other file formats as well as internal program representations are other examples of a logic description.

Although the foregoing systems and techniques have been described in detail by way of illustration and example for purposes of clarity and understanding, it will be recognized that the above described systems and techniques may be embodied in numerous other specific variations and embodiments without departing from the spirit or essential characteristics of the systems and techniques. Certain changes and modifications may be practiced, and it is understood that the systems and techniques are not to be limited by the foregoing details, but rather is to be defined by the scope of the appended claims.

What is claimed is:

1. A memory system comprising:
    a memory;
    a memory controller connected to the memory, the memory controller including a first performance monitor configured to generate efficiency data by monitoring performance including efficiency of a plurality of memory accesses associated with the memory system;
    a processor configured to determine efficiency and/or latency of the memory system, and reasons for any losses of efficiency and/or latency of the memory system, based at least in part on the efficiency data; and
    a performance debugging interface that provides real time information regarding the efficiency and/or latency of memory accesses within the memory system, and the reasons for any losses of efficiency and/or latency of the memory system.

2. A memory system in accordance with claim 1, wherein the first performance monitor is implemented in hardware on an integrated circuit.

3. A memory system in accordance with claim 1, wherein the memory controller includes a command queue configured to hold a plurality of user commands to write or read data from the memory, and wherein the memory controller includes a timer that measures whether a command issued by the memory controller corresponding to one of the user commands meets a timing requirement, wherein the timer is configured to measure a delay for the one of the user commands.

4. A memory system in accordance with claim 1, further comprising:
    a physical device connecting the memory controller to the memory;
    a memory controller interface connecting the memory controller to the physical device;
    a first local controller interface connecting the memory controller to a first master device;
    a second local controller interface connecting the memory controller to a second master device;
    a plurality of performance monitors including:
        the first performance monitor implemented in hardware within the memory controller, wherein the first performance monitor is configured to monitor performance of the memory controller;
        a second performance monitor implemented in hardware and configured to monitor performance of the memory controller interface;
        a third performance monitor implemented in hardware and configured to monitor performance of the first local controller interface;
        a fourth performance monitor implemented in hardware and configured to monitor performance of the second local controller interface.

5. The memory system according to claim 1, wherein the timing parameters comprise one or more of the following: command bus contention, wait to issue activate, wait to issue precharge, data bus contention, potential data reorder, wait to issue read/write command, and bank contention.

6. The memory system according to claim 1, wherein multiple classes of memory commands are processed in the memory system, and wherein the debugging interface provides information regarding how memory accesses of the different classes of memory commands interact with each other.

7. The memory system according to claim 1, wherein the different classes of memory commands correspond to memory commands issued to the memory by different master devices.

8. The memory system according to claim 1, wherein the different classes of memory commands correspond to one or more of: different user specified classes, different types of memory commands, different master devices, and different ports of the memory controller.

9. The memory system according to claim 1, wherein the performance of the memory system with respect to different classes of memory commands is measured by associating memory commands with tags identifying, for each memory command, the memory command class corresponding to such memory command.

10. The memory system according to claim 9, wherein the memory system is configured to
    store tags associated with memory commands during a time period such memory commands are being processed by the memory system, and
    monitor when a first memory command is delayed from being sent to memory because of processing required for a second memory command; and
    utilize information regarding the monitored interaction between the first memory command and the second memory command in generating information regarding classes of memory commands which are responsible for efficiency or latency losses within the memory system.

11. The memory system according to claim 1, wherein the memory system is configured to measure and provide information regarding an amount of efficiency and/or latency loss due to each of the different reasons provided for efficiency and/or latency loss.

12. The memory system according to claim 1, wherein the memory system is configured to measure and provide information regarding an amount of efficiency and/or latency loss due to interactions between a first class of memory commands and a second class of memory commands.

13. A method of improving performance of memory accesses in a memory system, the method comprising:
    generating efficiency data by monitoring performance of the memory system including monitoring an efficiency of a plurality of memory accesses associated with a memory controller connected to a memory;
    determining efficiency and/or latency of the memory system, and reasons for any losses of efficiency and/or latency of the memory system, based at least in part on the efficiency data; and
    providing real time information regarding the efficiency and/or latency of memory accesses within the memory system, and the reasons for any losses of efficiency and/or latency of the memory system.

14. The method according to claim 13, wherein multiple classes of memory commands are processed in the memory system, and wherein the debugging interface provides information regarding how memory accesses of the different classes of memory commands interact with each other.

15. The method according to claim 13, wherein the different classes of memory commands correspond to memory commands issued by different master devices to the memory.

16. The method according to claim 13, wherein the performance of the memory system with respect to different classes of memory commands is measured by associating memory commands with tags identifying, for each memory command, the memory command class corresponding to such memory command.

17. The method according to claim 16, wherein the memory system is configured to
store tags associated with memory commands during a time period such memory commands are being processed by the memory system, and
monitor when a first memory command is delayed from being sent to memory because of processing required for a second memory command; and
utilize information regarding the monitored interaction between the first memory command and the second memory command in generating information regarding classes of memory commands which are responsible for efficiency or latency losses within the memory system.

18. A memory controller comprising a plurality of timers and lookahead units, wherein the timers or the lookahead units are configured to be used to determine an amount of loss in an efficiency of the memory controller.

19. A memory controller in accordance with claim 18, wherein the timers or the lookahead units are configured to output a reason for the loss in efficiency, wherein the reason includes a precharge command delay, an activate command delay, a read command delay, a write command delay, a switch between ports of the memory controller, or a port of the memory controller that receives a user command to read or write data to a memory.

20. A method comprising:
monitoring a memory controller connected to a memory, wherein multiple classes of memory commands are processed in the memory controller;
determining an amount of loss in efficiency of the memory controller based on the monitoring;
providing information through an output interface regarding one or more reasons for the loss in efficiency of the memory controller, the reasons including how memory accesses of the different classes of memory commands interact with each other.

21. A method in accordance with claim 20, wherein the one or more reasons include one or more of the following: a precharge command delay, an activate command delay, a read command delay, a write command delay, a switch between ports of the memory controller, or a port of the memory controller that receives a user command to read or write data to a memory.

22. A method in accordance with claim 20, further comprising determining a latency of the memory controller, wherein the latency includes an average of a plurality of latencies, a minimum of a plurality of latencies, or a maximum of a plurality of latencies.

23. A computer system comprising:
performance monitors, implemented in hardware, for monitoring memory accesses within a memory system to generate efficiency data;
a connector for transferring the efficiency data to a software tool for analyzing the efficiency data;
a display device;
a processor configured to display, on the display device, a graphical user interface or text, wherein the graphical user interface or text provides information regarding an efficiency of the memory system, and reasons for any loss of efficiency of the memory system.

24. A computer system in accordance with claim 23, wherein the graphical user interface or text further provides information regarding a latency of the memory system and a reason for a loss in the latency of the memory system.

25. A computer system in accordance with claim 23, wherein the graphical user interface or text further provides information regarding a latency of the memory system, wherein the latency includes an average of a plurality of latencies, a minimum of a plurality of latencies, or a maximum of a plurality of latencies.

* * * * *